Figure 1:
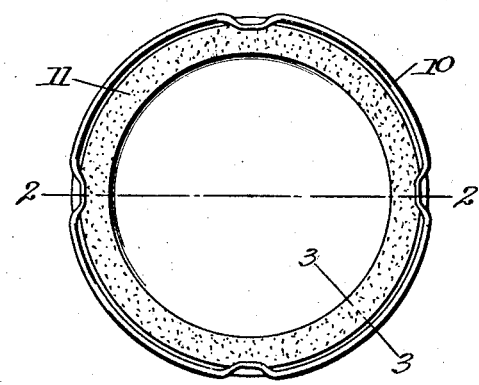

Feb. 28, 1933.  C. J. PARKER  1,899,821
CONTAINER
Filed Sept. 28, 1931

Inventor
C. J. Parker
By Cushman Byrant Darby Cushman
Attorneys

Patented Feb. 28, 1933

1,899,821

UNITED STATES PATENT OFFICE

CECIL J. PARKER, OF BALTIMORE, MARYLAND, ASSIGNOR TO CROWN CORK & SEAL COMPANY, INC., OF BALTIMORE, MARYLAND, A CORPORATION OF NEW YORK

CONTAINER

Application filed September 28, 1931. Serial No. 565,500.

My present invention relates to improvements in sealing means adapted to be interposed between a cap and a container and is useful either where a top sealing surface is employed or where a groove is provided to form a side seal.

Heretofore, with lug or screw caps after sealing under vacuum, the cap could not be removed, due to the fact that the vacuum in the container permitted the atmospheric pressure to press the cap on the glass to such an extent that the friction between the rubber composition commonly employed and the glass was so great, that the cap could not be released.

It is an object of the present invention to overcome this difficulty by providing a sealing material having all the necessary characteristics of resiliency and permanency, but possessing, moreover, the additional advantage of creating a low coefficient of friction between the rubber and the glass or cap.

In other words, the present invention comprises a sealing material particularly useful with caps of the screw and lug type which require a turning movement for their application and removal. As stated, where vacuum sealing is resorted to with conventional structures it is difficult to apply or remove the closure by the turning motion due to the tremendous downward sealing pressure of the cap. But in accordance with this invention, wherein a substantially permanent and available lubricated surface is provided on the sealing gasket by a lubricating material, the cap may be readily turned or unscrewed to apply or remove it.

An essential feature of the invention is the provision of a rubber-like composition which has included therein a lubricating material of a character which affords a permanent antifrictional or lubricating surface. The invention is thus distinguished from the use of a gasket of paper or similar gasket which is merely provided with a coating of wax. Applicant provides a new combination which consists essentially of a cap, preferably a one-piece cap, of conventional type, such as a screw or lug cap, a gasket composition of rubber-like character having as an element therein of a lubricating material which provides a permanent surface film. This film facilitates the turning movement of the cap when the same is applied and removed and enables one to obtain with a cap of one-piece construction, sealing efficiencies which have heretofore been obtainable only with two-piece caps. As will be understood, in a two piece cap, the gasket holding disc need not move when the retaining ring is turned either to apply or remove the cap and consequently in this type of cap a lubricating surface film is not of such importance as in a one-piece cap. It will be understood, however, that the invention is also useful in caps of two-piece construction.

A further object of the invention is to provide a sealing means comprising a composition containing a lubricant which, in practical application, forms as a film on the exposed surface of the seal. The sealing material, as stated, is compressible and resilient and by having a low coefficient of friction, the cap can be readily released without injuring the seal which will yield sufficiently and then resume substantially its original contour.

I, therefore, have provided a hermetic seal for containers characterized by all of the attributes of a first class sealing material and in addition having a lubricating action which will enable the cap to be turned on the container while under vacuum.

Figure 2:
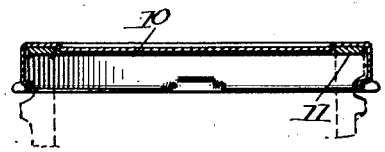
Figure 5:
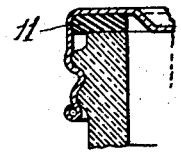
Figure 4:
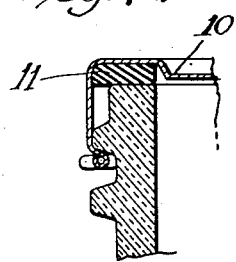
Figure 3:
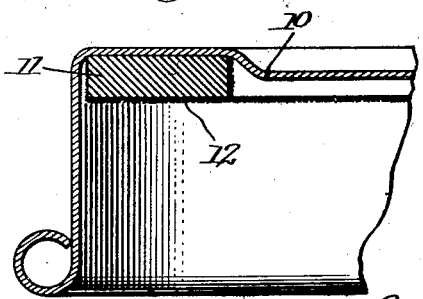

In the drawing:

Figure 1 is a bottom plan view,
Figure 2 is a sectional view on line 2—2 of Figure 1,
Figure 3 is an enlarged sectional view, and
Figures 4 and 5 are fragmentary sectional views showing a lug cap and a screw cap respectively applied to a container.

The improved rubber composition of my invention may take the form of a vulcanized sealing ring, a vulcanized liner equal in area to the area of the interior of the cap, or may be produced as a flowable mass which will be flowed into a groove in the cap or container and vulcanized in such grooves. I may also form an unvulcanized tube and cut off rings of various sizes which will possess sufficient tackiness to stick in the groove of the cap or container and thereupon either use the material in its unvulcanized condition, or preferably vulcanize it in the groove to provide a sealing surface. It will be understood also, that the ring may be secured to the cushion liner of a cap either in a ring form or a complete covering for the usual paper, cork or other liner forming a composite article in which the sealing material is united to the cushion liner.

The composition comprises ordinary commercial rubber that is, natural and synthetic rubber or rubber substitutes of the various commercial varieties available. By "rubber-like" compositions as used herein, I mean a composition containing ingredients of such general character. In such "rubber-like" materials is incorporated an inert filler such as clay, a vulcanizing agent, preferably sulphur and an organic accelerator, preferably one which will be rapid acting such as tetra-methyl-thiuram-disulphide. In addition the composition contains a lubricating material of the order of ceresin and a "blooming" agent and emollient of the order of stearic acid.

All of the above mentioned ingredients are known to rubber makers and it will be understood that any desired rubber composition, vulcanizing agent, filler and accelerator may be employed.

My invention consists in adding to such rubber composition a blooming agent and a lubricating material in such amounts as to accentuate the surface film or bloom, whereby the lubricant is caused to come to the surface of the sealing member and form a non-adhesive, anti-frictional surface coating.

Therefore, I have used substantially six per cent of the blooming agent calculated on the rubber content, with an appropriate amount of ceresin, so that a lubricating film is formed on the sealing material which enables the cap to be easily turned on the container when subjected to high external pressure such as required when vacuum sealing is resorted to.

For instance, I may make a composition having the following ingredients:

| | Parts |
|---|---|
| Rubber | 30.0 |
| Accelerator | 0.25 |
| Stearic acid | 2.0 |
| Sulphur | 1.0 |
| Zinc oxide | 1.5 |
| Clay | 50.25 |
| Ceresin | 15.0 |

It will be seen that the amount of stearic acid used is rather more than 6% calculated on the rubber employed.

I have found by experiment that the most advantageous results are obtained when the rubber constitutes from 30 to 35 per cent of the composition and the ceresin from 15 to 20 per cent; although greater or less amounts of these materials may be used, the balance between lubricating effect and resiliency seems best to be served by keeping within these limits. I may also introduce a certain amount of coloring pigment into the composition using a formula such as the following:

| | Parts |
|---|---|
| Rubber | 35.0 |
| Accelerator | 0.3 |
| Stearic acid | 2.0 |
| Sulphur | 1.0 |
| Zinc oxide | 1.7 |
| Iron oxide | 3.0 |
| Clay | 42.0 |
| Ceresin | 15.0 |

In place of ceresin, I may use any high melting point paraffin wax in about the same proportions indicated, and with regard to the stearic acid, various metallic stearates may be used, and in fact any materials which are capable of having the functions of the ceresin and the stearic acid to produce the desired surface bloom or film, can be incorporated in the composition.

It will be understood that my improved rubber composition is compressible, elastic and substantially permanent and has all of the properties of a high quality sealing substance.

I have found that when it is employed, whether under a vacuum sealing condition or the ordinary purposes of a gasket that, although it can be deformed, upon application of external pressure, nevertheless resumes its original shape so that the seal can be used indefinitely.

It will be clear, therefore, that by providing a surface bloom or film, the seal or gasket will possess a very low coefficient of friction and thus enable a cap to be readily removed or released.

At the present time with the sealing compositions now in use, it is practically impossible to remove the cap, unless it is punctured, in order to equalize pressure on both sides.

By employing a sealing material which will reduce the coefficient of friction between the glass and the rubber composition to the point where the cap can be removed, the necessity for puncturing the cap is obviated and at the same time the rubber compound will hold successfully a predetermined vacuum as long as required.

In the case of lug and screw caps as shown in Figures 4 and 5 it is well understood that the threads on the glass container are inclined and act as cams when the cap is being removed, so that by having a low coefficient of friction between the seal and the glass or the seal and the cap, this camming action will perform its true function without causing any distortion of the seal. In other words, my improved sealing material does not require that an external pressure be applied such as would tear the seal, but simply a sufficient pressure as will release the cap initially when the camming action will permit the cap to easily be removed.

Since no distortion of the seal results and since it is elastic and resumes its original shape, the cap may be removed and replaced as desired without interfering with the hermetic sealing property of the cap. This is important as temperature changes in a container will cause either a slight vacuum or pressure therein and unless the cap is sealed hermetically, there is an interchange of air which is termed breathing, and is highly undesirable, since it supplies oxygen to the product and permits spoilage.

My invention, therefore, is applicable for use in the vacuum sealing or containers without fear of causing the occurrence of any of the present objections, since the surface bloom or film will at all times permit the cap to be turned or unscrewed without the necessity of puncturing the cap. My improved composition, as stated, may be applied to the groove in the cap or the groove in the container and may be vulcanized in such grooves. It may, moreover, not only be united to either of these parts, but may be united to the usual cushion of cork or fibrous material forming a composite article, and either vulcanized to the liner or subsequently vulcanized as desired.

In the drawing I have illustrated a conventional lug cap at 10 and the sealing member at 11. The surface film or bloom is illustrated at 12.

What I claim is:

1. A container closure adapted to be applied and removed by a turning movement comprising a skirt having retaining means thereon and a top, said closure having therein a sealing gasket comprising a rubber-like composition having included as an ingredient therein a lubricating material which provides a non-adhesive anti-frictional sealing surface.

2. A one-piece cap of the screw or lug type having a depending skirt and top and having a sealing gasket comprising a rubber-like composition provided with a non-adhesive anti-frictional surface formed by a lubricating material included as an ingredient in the gasket composition.

3. A cap of the screw or lug type comprising a top and a skirt provided with retaining means and having therein a sealing gasket comprising a vulcanized rubber composition containing as an ingredient a lubricating element forming a surface bloom of lubricating material.

4. A cap of the screw or lug type comprising a top and a skirt provided with retaining means and having therein a sealing gasket comprising a vulcanized rubber composition containing as an ingredient a lubricating element forming a surface bloom of lubricating material, said composition containing stearic acid.

5. A cap of the screw or lug type comprising a top and a skirt provided with retaining means and having therein a sealing gasket comprising a vulcanized rubber composition containing as an ingredient a lubricating element forming a surface bloom of lubricating material, said composition containing stearic acid and said lubricating agent being a wax.

6. In combination, a container, a cap on said container adapted to be removed by turning movement and a sealing gasket between said cap and container comprising a rubber-like composition having included as an ingredient therein a lubricating element which provides a non-adhesive anti-frictional sealing surface.

7. A container closure adapted to be applied and removed by a turning movement comprising a skirt having retaining means thereon and a top, said closure having therein a sealing gasket comprising a resilient compound having as an ingredient therein a lubricating material which provides a non-adhesive anti-frictional and permanent surface film.

In testimony whereof I affix my signature.

CECIL J. PARKER.

DISCLAIMER 1,899,821.—*Cecil J. Parker*, Baltimore, Md. CONTAINER. Patent dated February 28, 1933. Disclaimer filed April 21, 1943, by the assignee, *Crown Cork & Seal Company, Inc.*

Hereby enters this disclaimer to claims 1, 2, 3, 6, and 7 of said patent.

[*Official Gazette May 18, 1943.*]